June 20, 1950          L. E. BOBER          2,512,009
PIPE JOINT
Filed July 15, 1944
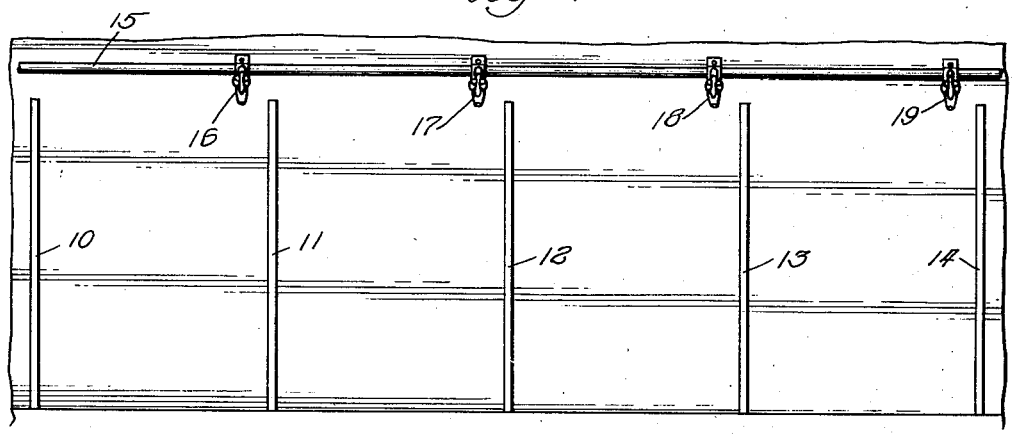
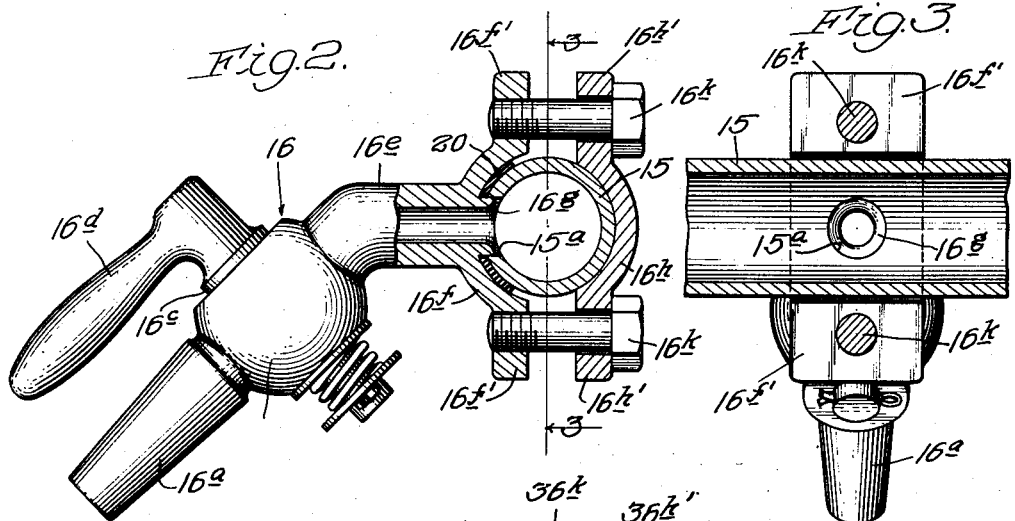
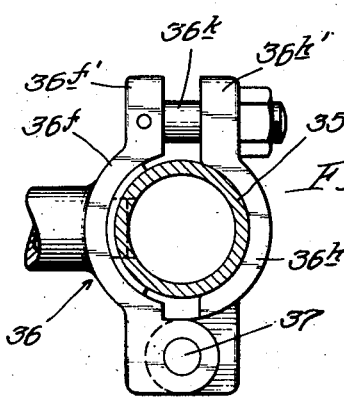
Inventor:
Louis E. Bober, Patented June 20, 1950

2,512,009

UNITED STATES PATENT OFFICE 2,512,009

PIPE JOINT

Louis E. Bober, La Grange, Ill., assignor to Babson Bros. Co., a corporation of Illinois Application July 15, 1944, Serial No. 545,069

1 Claim. (Cl. 285—108)

This invention relates to a stall cock, and more particularly to a fitting for the vacuum system of a dairy barn.

One feature of this invention is that it provides an improved fitting adapted to make connection to a pipe; another feature of this invention is that it provides an improved stall cock for the vacuum system of a dairy barn; yet another feature of this invention is that, by use of my improved stall cock, a vacuum system can be installed in a dairy barn in a fraction of the time now required; still another feature is that the pipe line can be flushed and cleaned easier than has heretofore been the case; and a further feature of this invention is that the stall cock automatically assumes the desired angular position with reference to the pipe, and does not change such position during use. Other features and advantages of this invention will be apparent from the following specification and the drawings, in which:

Figure 1 is an elevational view of a portion of a row of stalls in a dairy barn; Figure 2 is a view, partly in side elevation and partly in section, of one embodiment of my invention; Figure 3 is a sectional view along the line 3—3 of Figure 2; and Figure 4 is a view, principally in side elevation, of another form of my invention.

In a dairy barn of the type wherein each cow is milked by machine in her own stall, vacuum for operation of the milking machine is derived from a vacuum pipe line generally installed just above the row of stalls. The vacuum system comprises a source of vacuum, as a vacuum tank, vacuum pump, and motor, and pipe lines running along each row of stalls and generally provided with a stall cock or connection fitting for each stall. This is preferably located close to the right side of the stall, looking in towards the back, so that the operator may conveniently connect the milker hose line to the stall cock when he is standing on the right side of the cow.

The systems now in conventional use make use of a T coupling for the connection of the stall cock. That is, the pipe running along the row of stalls is cut at the point where a stall cock is desired, threaded, and a T coupling screwed on. Then the stall cock is screwed into the projecting portion of this coupling, and another length of pipe line is screwed into the other portion. It has been found impossible, as a practical proposition, to cut all of the lengths of pipe section in advance and then assemble them over the stalls, as there is generally some slight difference in the width of the stalls, and there is always a certain amount of variation in the tightness with each individual T coupling is drawn up. If these variations become cumulative which is frequently the case in practice, any attempt to prefabricate the pipe line results in stall cocks being badly out of position in the far end of the line. Accordingly, installations are now made by measuring, cutting and threading each section of pipe line individually on the job, and after the pipe line has been assembled and installed to the point where the next section is to be added. It is obvious that this is a slow and laborious job.

Moreover, considerable difficulty is encountered in getting the right angle for the T coupling and for the stall cock. The extending part of the T coupling should never be below horizontal, and is now generally extending up somewhat above the horizontal in order to prevent any leakage of moisture out of the pipe line and into the stall cock. Then, too, the stall cock nipple portion should extend out in a vertical plane for greatest ease of connection of the milker hose. In an effort to secure the exact angular positioning desired in both of these cases, it frequently happens that threads are stripped because of drawing the elements up too tightly, or that a joint lacks air because the elements are not drawn up tightly enough. This is particularly true where a system has once been installed and is then taken down as for cleaning and reinstalling.

Furthermore, the use of a T coupling or T fitting, with the sections of the pipe line screwed to each end, provides a pocket or recess in the pipe line which greatly accelerates the building up of solids at this point. I have found that solids (milk solids and dirt) build up fastest in any event at the point where the stall cock makes connection to the pipe line, as there is a sudden change in direction of air flow at this point; and this has been greatly accelerated by the pocket provided by the T coupling, all plugging or blocking of pipe lines which I have seen having occurred at this point. Moreover, the presence of the pocket makes it almost impossible completely to flush out the pipe with the lye solution generally used for this purpose.

I have devised and am here disclosing and claiming a dairy barn vacuum system which obviates these and other objections of former systems. In my improved system a single piece of pipe extends along all of the stalls in a single row, or at least along a plurality of such stalls, such pipe having openings drilled therein at appropriate intervals; and a stall cock is associated with each of these openings in such a way that a tightly sealed connection is made by clamping action, without any threading and without any pockets or projections within the pipe line, yet proper registry of the stall cock with the opening is insured at all times by an annular registering portion extending at least partly into such opening. This annular portion preferably has its inner edge flared outwardly to the surface of the drilled opening. This avoids the formation of pockets between corners, produces less resistance to flow of air through the fitting, and makes it easier to clean that portion of the fitting that joins the pipe.

In the particular embodiment of my invention illustrated in Figures 1–3, a plurality of stalls are here shown as defined by stall partition arrangements 10, 11, 12, 13 and 14, these generally being of piping sunk in or otherwise connected to the concrete flooring generally used. Just above the tops of these partitions, and at the back of the row of stalls, extends a pipe here identified as 15, it being understood that this pipe is connected at one end to a vacuum tank or other source of vacuum, not shown as it forms no part of the present invention. This is a single piece of pipe, as distinguished from a plurality of sections of pipes coupled together. It is provided at appropriate intervals with connection fittings more generally known as stall cocks, these being here identified as 16, 17, 18 and 19. Inasmuch as these stall cocks are all identical, and their manner of connection to the pipe 15 is the same, only the stall cock 16 will be described in detail.

Referring now more particularly to Figures 2 and 3, it will be seen that the stall cock comprises, as its principal parts, a nipple or hose connection portion here identified as 16a; a main body portion here identified as 16b, this body portion containing valve means in the form of a plug 16c adapted to be rotatably moved by the handle 16d; a portion 16e here termed the shank portion, this portion including a 45° bend; and a base portion 16f, this portion comprising a part in the form of a longitudinal section of a cylinder, conforming to the shape of the pipe 15, and outwardly extending flange portions 16f'. As may be best seen in Figure 2, the curvature of the curved base portion 16f substantially conforms to that of the pipe 15 although exact conformation in this regard is not necessary. I have found, for example, that one stall cock may be so designed as to be usable on either a ¾" or 1" pipe line, now requiring completely different fittings.

The pipe 15 is provided in its side wall with an opening 15a having its axis horizontal; and this opening is adapted to receive, in a fairly close but sliding fit, an annular registering portion 16g of the stall cock. This annular portion is preferably so proportioned as to extend at least partly into such opening, but not of such length as to extend past the opening and project into the interior of the pipe. The inner edge of the portion 16g is preferably flared outwardly, as shown in Figure 2. Formation of the base portion 16f in the shape of a longitudinal section of a cylinder, and use of this annular registering portion 16g, ensures placement of the stall cock in the desired angular and longitudinal position, and ensures maintenance of such position.

Surrounding the annular portion 16g and the opening 15a is a sealing washer here identified as 20. This washer is preferably of resilient material resisting deterioration with age, as certain synthetic rubbers, although it may also be a washer of soft lead or other appropriate material. Clamping of the base member and sealing washer against the pipe 15 is effected by use of a clamping member 16h having a portion conforming to the curvature of the pipe and extending flange portions 16h'; and studs 16k drawing the flange portions 16f' and 16h' together.

As will be readily appreciated from the foregoing description, my vacuum system can be easily and quickly installed. The pipe 15 may be installed in its position above the row of stalls, the desired point for each stall cock marked, and then openings drilled in through the wall of the pipe by an electric or other drill. Or, if preferred, the positions of the stall cocks may be marked, the pipe laid on the barn floor, and the drilling done there. In any event, the drilling of the openings in the wall of the pipe is many times quicker than the installation of a pipe line with a T fitting at each place a stall cock is desired. Then it is only necessary to slip a sealing washer around the annular registering portion and then to slip this portion into the opening. While the front portion of the stall cock assembly is then held in place with one hand, the back clamping means and studs can be placed in position with the other, the studs being finally tightened with a few turns of a wrench.

While the particular embodiment of my invention illustrated in Figures 1–3 requires the use of two studs, the modified form of my invention shown in Figure 4 requires tightening of only one stud. In this form of my invention the stall cock 36 has its base portion 36f and its clamping portion 36h pivoted together at the bottom by the trunnion or pivot shaft 37. In the use of this form of my invention the upper locking means may comprise a bolt 36k pivoted to the upper flange 36f' at one end and received in a slot in the upper flange 36h' of the clamping portion. With this arrangement there are no separate parts, and one merely slips the parts 36f and 36h around the pipe 35, pivots the bolt 36k down into the position shown in the drawings, and tightens up the nut. While an arrangement of this kind requires a slight additional original manufacturing cost, the advantages of its use in the field are such as to render it a desirable form of my invention under many circumstances.

While I have shown and described certain embodiments of my invention, it is to be understood that it is capable of many modifications. Changes, therefore, in the construction and arrangement may be made without departing from the spirit and scope of the invention as disclosed in the appended claim.

I claim:

In a vacuum system for a dairy barn including a vacuum pipe having an opening arranged substantially vertically therein, apparatus comprising: a curved portion having the shape of a section of a cylinder and substantially conforming to the shape of the pipe adjacent said opening, said curved portion being provided with an annular registering portion adapted to extend into but not through said opening to a point short of the inner surface of the pipe and an outwardly extending tubular portion having a substantially horizontal section communicating with said registering portion and an outwardly and downwardly extending section at the outer end of said horizontal section, said annular registering portion fitting closely within said opening and the inner edge of said portion being flared outwardly; a cock in said outwardly and downwardly extending section; a resilient sealing means between said curved portion and said pipe and surrounding said opening; a clamping member adapted to be arranged against said pipe on the side opposite said curved portion; and a member extending between said curved portion and clamping member for clamping the curved portion and sealing means against the pipe with said annular portion extending into said opening.

LOUIS E. BOBER.

REFERENCES CITED

The following references are of record in the file of this patent:

UNITED STATES PATENTS

| Number | Name | Date |
|---|---|---|
| 105,907 | Clark | Aug. 2, 1870 |
| 572,606 | Jewell | Dec. 8, 1896 |
| 608,613 | Linich | Aug. 9, 1898 |
| 717,042 | Smith | Dec. 30, 1902 |
| 937,958 | Phillips | Oct. 26, 1909 |
| 1,036,674 | Meurling | Aug. 27, 1912 |
| 1,048,364 | Smith | Dec. 24, 1912 |
| 1,178,234 | Hayden | Apr. 4, 1916 |
| 1,444,727 | Burdin | Feb. 6, 1923 |
| 1,718,822 | Hulbert | June 25, 1929 |
| 1,977,511 | Graves | Oct. 16, 1934 |
| 2,239,651 | McMurray et al. | Apr. 22, 1941 |
| 2,271,465 | Robinson et al. | Jan. 27, 1942 |

FOREIGN PATENTS

| Number | Country | Date |
|---|---|---|
| 405,554 | Great Britain | Feb. 8, 1934 |
| 9,197 | Australia | Sept. 5, 1933 |